US012297962B2

(12) United States Patent
Handa

(10) Patent No.: US 12,297,962 B2
(45) Date of Patent: May 13, 2025

(54) GAS FILLING METHOD

(71) Applicant: HONDA MOTOR CO., LTD., Tokyo (JP)

(72) Inventor: Kiyoshi Handa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 18/372,106

(22) Filed: Sep. 24, 2023

(65) Prior Publication Data

US 2024/0102612 A1 Mar. 28, 2024

(30) Foreign Application Priority Data

Sep. 28, 2022 (JP) ................................ 2022-154474

(51) Int. Cl.
*F17C 5/00* (2006.01)
*F17C 5/06* (2006.01)

(52) U.S. Cl.
CPC ................ *F17C 5/007* (2013.01); *F17C 5/06* (2013.01); *F17C 2221/012* (2013.01); *F17C 2225/0123* (2013.01); *F17C 2227/04* (2013.01)

(58) Field of Classification Search
CPC .................. F17C 5/007; F17C 2227/04; F17C 2225/0123; F17C 2221/012
See application file for complete search history.

(56) References Cited

U.S. PATENT DOCUMENTS

| | | | | |
|---|---|---|---|---|
| 9,016,329 | B2 * | 4/2015 | Mori | F17C 5/06 141/2 |
| 10,465,849 | B2 * | 11/2019 | Handa | F17C 13/084 |
| 11,193,632 | B2 * | 12/2021 | Handa | B60L 50/72 |
| 12,025,279 | B2 * | 7/2024 | Handa | F17C 5/06 |

FOREIGN PATENT DOCUMENTS

| | | |
|---|---|---|
| JP | 2007-298051 A | 11/2007 |

OTHER PUBLICATIONS (Draft) JPEC-S 0003 by Japan Petroleum Energy Center, “Technical Standard for Filling Compressed Hydrogen”, Feb. 17, 2016, with the English translation of the pertinent portion.
Issuing Committee: Fuel Cell Standards Committee, “Fueling Protocols for Light Duty Gaseous Hydrogen Surface Vehicles” SAEJ2601 by SAE International in US, May 29, 2020.

* cited by examiner

*Primary Examiner* — Timothy L Maust
(74) *Attorney, Agent, or Firm* — Carrier, Shende & Associates P.C.; Joseph P. Carrier; Fulchand P. Shende

(57) ABSTRACT

A gas filling method for filling a tank with gas by supplying the gas from an accumulator to the tank through a pipe includes: a temperature separation pressure detecting step of detecting whether the pressure in the tank has reached a temperature separation pressure during filling of the tank with the gas; and a pressure rise rate increasing step of filling the tank with the gas by increasing the pressure rise rate of the pressure in the tank after the pressure in the tank has reached the temperature separation pressure.

4 Claims, 10 Drawing Sheets

GAS FILLING METHOD

CROSS-REFERENCE TO RELATED APPLICATIONS

This application is based upon and claims the benefit of priority from Japanese Patent Application No. 2022-154474 filed on Sep. 28, 2022, the contents of which are incorporated herein by reference.

BACKGROUND OF THE INVENTION

Field of the Invention

The present invention relates to a gas filling method for filling a tank with a fuel gas (gas) from a gas accumulator (hereinafter simply referred to as an accumulator) through a pipe.

Description of the Related Art

In recent years, research and development have been conducted on fuel cells (FC) that contribute to energy efficiency, in order to ensure that more people have access to affordable, reliable, sustainable and modern energy.

For example, a fuel cell vehicle is equipped with the fuel cell, a tank for storing the fuel gas, and a motor. The fuel cell generates electric power by an electrochemical reaction between the fuel gas supplied from the tank and an oxygen-containing gas (air). The fuel cell vehicle travels by driving the motor using the electric energy generated by the fuel cell.

The tank mounted on the fuel cell vehicle is filled with gas (hydrogen gas) through a pipe (including a hose) at a filling station (hydrogen station). The hydrogen station includes a high-pressure gas accumulator.

"Technical Standard for Filling Compressed Hydrogen" such as SAEJ2601 or JPEC-S 0003 is applied to the control of filling of the fuel gas (compressed hydrogen) into the fuel cell vehicle or the like at the hydrogen station.

In the "Technical Standard for Filling Compressed Hydrogen", a speed (pressure rise rate) and the like during hydrogen filling are calculated by simulation, and the result is used for filling control in the form of a map or a table. In this simulation, in order to improve the calculation speed, a calculation model in which the temperature of the gas is assumed to be uniform inside the tank is used. Inside the tank at the start of filling, the gas flowing into the tank is blown out to stir the interior of the tank, whereby the interior temperature is substantially uniform. However, as the filling proceeds and the pressure inside the tank increases, the volumetric flow rate of the blown-out gas decreases. Then, the interior of the tank is not sufficiently stirred, and a temperature distribution occurs inside the tank. In particular, when the tank volume is large, the outside air temperature is high, and the filling time is long, a remarkable temperature distribution (temperature separation) is likely to occur inside the tank. To be more specific, as shown in FIG. 10A and FIG. 10B, the temperature of the gas rises in the upper portion (dark color region) on the back side as viewed from the gas feed port of the tank. In this case, the temperature of the simulation does not coincide with the actual temperature inside the tank. In addition, when the temperature of the gas locally rises, the value of the measured tank temperature varies, and the tank temperature cannot be stably detected. Furthermore, if a high tank temperature temporarily exceeding a predetermined temperature is detected, a safety device may be activated and the filling operation may be stopped.

In this regard, the high-pressure gas storage system disclosed in JP 2007-298051 A is provided with a gas guide member capable of changing an injection direction of the fuel gas in a high-pressure gas container when the high-pressure gas container is filled with the fuel gas, and the injection direction of the fuel gas is changed by driving the gas guide member. As a result, the injection direction of the fuel gas is directed toward a portion where heat is easily radiated according to the temperature condition and the pressure condition of the high-pressure gas container, so that the temperature rise in the high-pressure gas container can be suppressed.

SUMMARY OF THE INVENTION

Incidentally, when the gas guide member capable of changing the injection direction of the fuel gas is provided in the high-pressure gas container (tank), the structure of the high-pressure gas container becomes complicated and the number of components increases, leading to an increase in cost. Further, the gas guide member includes a movable portion, leading to a decrease in reliability.

An object of the present invention is to solve the above-described problem.

According to an aspect of the present invention, there is provided a gas filling method for filling a tank with gas from an accumulator of the gas in a gas filling system, the gas filling system including: the tank; the accumulator; and a pipe configured to connect the accumulator and the tank, and supply the gas from the accumulator to the tank, the gas filling method comprising: setting a temperature separation pressure that is a pressure of the gas at which temperature separation occurs during filling of the tank with the gas; detecting whether a pressure in the tank has reached the temperature separation pressure during the filling of the tank with the gas; and filling the tank with the gas by increasing a pressure rise rate of the pressure in the tank after the pressure in the tank has reached the temperature separation pressure.

According to the present invention, with a simple method based on filling control of the hydrogen station without providing a special mechanism in the tank, it is possible to suppress occurrence of temperature separation in the tank, complete gas filling in a short time, and achieve gas filling with high performance and high efficiency.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Configuration of Hydrogen Filling System

Figure 1:
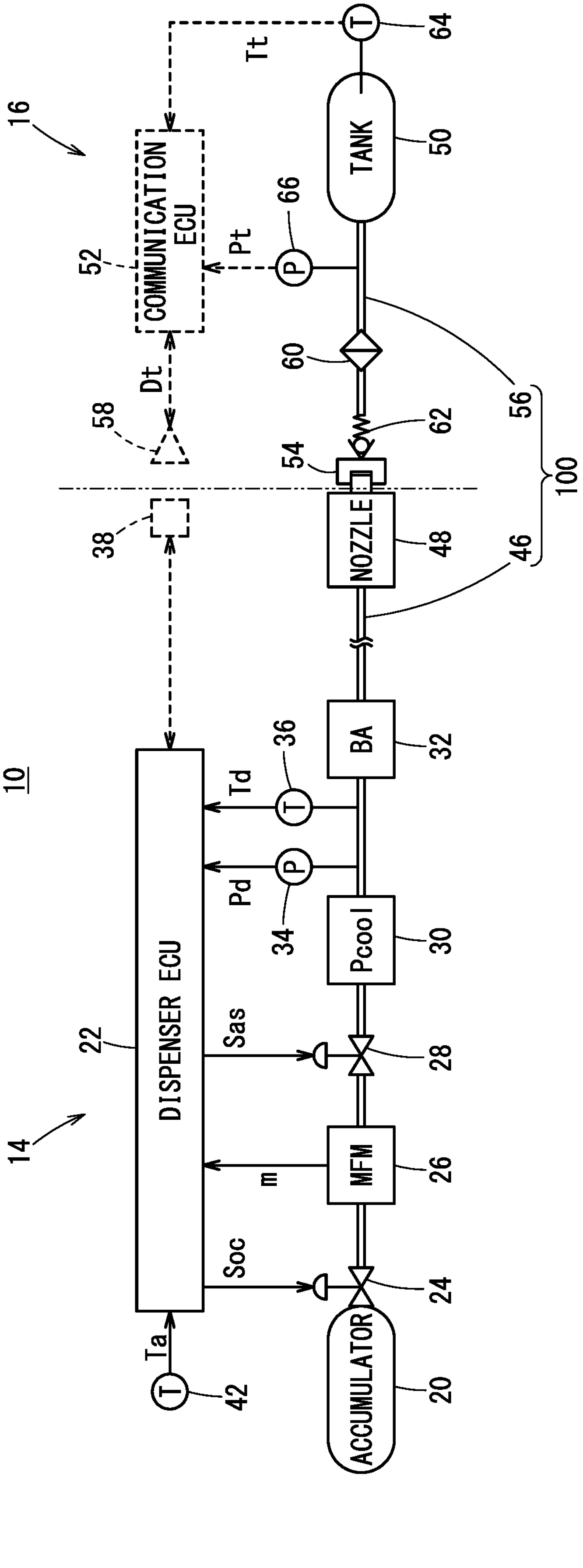
FIG. 1 is a configuration diagram of a hydrogen filling system to which a gas filling method according to an embodiment is applied.

FIG. 1 shows a configuration of a hydrogen filling system (gas filling system) 10 according to an embodiment to which a gas filling method according to an embodiment is applied.

The hydrogen filling system 10 includes a hydrogen station 14 which is a filling station (filling stand) shown on the left side of the two dot chain line, and a fuel cell vehicle (vehicle) 16 shown on the right side of the two dot chain line.

The hydrogen station 14 includes an accumulator 20 serving as a supply source of hydrogen gas (gas) which is a fuel gas.

The vehicle 16 is equipped with a hydrogen tank (tank) 50 filled with the gas supplied from the accumulator 20.

The vehicle 16 includes a fuel cell (not shown) and a travel motor (not shown), in addition to the tank 50 that stores the filled gas.

The fuel cell generates electric power by an electrochemical reaction between the fuel gas supplied from the tank 50 and an oxygen-containing gas (air) supplied from a compressor (not shown).

The vehicle 16 is a fuel cell vehicle that travels by driving the motor using electric power generated by the fuel cell.

Examples of the fuel cell vehicle include a relatively small passenger car and a large vehicle such as a bus or truck.

The fuel cell vehicle is a moving body which includes the tank for storing gas and the fuel cell, and travels on the ground.

The moving body to which the present invention is applied is not limited to a moving body traveling on the ground, but includes an airplane, a ship, a submarine, and the like.

As shown in FIG. 1, the hydrogen station 14 includes a dispenser electronic control unit (ECU) 22, and the vehicle 16 includes a communication ECU 52.

In FIG. 1, the communication ECU 52 drawn by the broken line and the components related to the communication ECU 52 are not necessary for implementing (using) the gas filling method according to the embodiment.

Each of the dispenser ECU 22 and the communication ECU 52 is a control device, and is constituted by a computer including one or more processors (CPUs), a memory (storage device), a timer (time measurement device), a counter (counting device), an input/output interface, and an electronic circuit.

The one or more processors (CPUs) execute computer-executable instructions, such as programs, stored in the memory. In addition to the computer-executable instructions, data such as acquired physical quantities and various control maps referred to by the data are recorded in the memory.

The processors (CPUs) execute calculations (various functions) by referring to the control map as necessary in accordance with the computer-executable instructions based on the acquired physical quantities or the like.

In FIG. 1, the vehicle 16 includes a vehicle pipe (pipe) 56 extending from the tank 50 to a receptacle 54, and a communication device 58 using infrared rays or the like to transmit and receive data signals Dt to and from the hydrogen station 14.

The vehicle pipe 56 connecting the tank 50 and the receptacle 54 is provided with a dust filter 60, and a check valve 62 that is provided near the receptacle 54 and prevents the gas from flowing back from the tank 50 toward the receptacle 54.

An in-tank temperature sensor 64 is provided inside the tank 50, and a pressure sensor 66 is provided in the vehicle pipe 56 near the tank 50.

The communication ECU 52 acquires a tank temperature Tt detected by the in-tank temperature sensor 64 and a pressure (tank pressure) Pt inside the tank 50 detected by the pressure sensor 66, and generates the data signal Dt.

The generated data signal Dt is transmitted via the communication device 58 to the dispenser ECU 22 through a communication device 38 provided in the hydrogen station 14.

The communication device 38 provided in the hydrogen station 14 is integrally attached to a nozzle 48.

When the nozzle 48 of the hydrogen station 14 is connected to the receptacle 54 of the vehicle 16, the communication device 38 faces the communication device 58 provided in the vehicle 16. As a result, the data signal Dt or the like can be transmitted and received between the communication devices 38 and 58 via radio waves such as infrared rays.

The accumulator 20 of the hydrogen station 14 stores high-pressure hydrogen gas to be supplied to the tank 50 of the vehicle 16.

The accumulator 20 is provided with a shut-off valve 24. A station pipe 46 extending from the shut-off valve 24 to the nozzle 48 is connected between the shut-off valve 24 and the nozzle 48. The accumulator 20 is supplied with high-pressure hydrogen gas from a compressor (not shown). The high-pressure hydrogen gas may be directly supplied to the vehicle 16 from the compressor. Alternatively, liquid hydrogen may be directly pressurized and heated to obtain high-pressure hydrogen gas.

The accumulator 20 and the tank 50 are connected to each other (communicate with each other) by a pipe 100 formed of the station pipe 46 and the vehicle pipe 56.

The station pipe (pipe) 46 is provided with a mass flow meter (MFM) (or a flow rate sensor) 26, a flow rate adjusting valve 28, a precooler (Pcool) 30, and a breakaway (BA) 32 in this order from the shut-off valve 24 toward the nozzle 48. A portion of the station pipe 46 between the breakaway 32 and the nozzle 48 is formed as a flexible hose.

A pressure sensor 34 and a temperature sensor 36 are provided in the station pipe 46 between the precooler 30 and the breakaway 32.

The pressure sensor 34 detects the gas pressure in the accumulator 20 (the hydrogen station 14) obtained when the shut-off valve 24 is open, as a dispenser pressure (gas pressure) Pd. The temperature sensor 36 detects the temperature of the gas supplied from the accumulator 20, as a dispenser temperature (gas temperature) Td.

The flow rate sensor 26 detects a mass flow rate (flow rate) m of the gas flowing through the pipe 100.

The dispenser pressure Pd, the dispenser temperature Td, and the flow rate m detected by the pressure sensor 34, the temperature sensor 36, and the flow rate sensor 26, respectively, are acquired as physical quantities by the dispenser ECU 22.

The shut-off valve 24 is opened and closed by an opening/closing signal Soc output from the dispenser ECU 22. The shut-off valve 24 transitions from an open state to a closed state in response to the opening/closing signal Soc serving as a closing signal, and maintains the closed state. The shut-off valve 24 transitions from the closed state to the open state in response to the opening/closing signal Soc serving as an opening signal, and maintains the open state.

The opening degree of the flow rate adjusting valve 28 can be continuously adjusted by a flow rate adjusting signal Sas output from the dispenser ECU 22. In other words, the gas flow rate in the pipe 100 can be continuously adjusted by the flow rate adjusting valve 28 whose opening degree is adjusted by the flow rate adjusting signal Sas. The dispenser pressure Pd is controlled (adjusted) by adjusting the gas flow rate in the pipe 100.

The precooler 30 cools the gas supplied from the accumulator 20 to the vehicle pipe 56 at a position before the gas is filled into the tank 50 to suppress a temperature rise of the gas in the tank 50, thereby enabling rapid filling. The temperature of the cooled gas is a precool temperature.

The breakaway 32 is a safety device connected between the accumulator 20 and the nozzle 48. When the nozzle 48 is pulled by a strong external force, the breakaway 32 automatically closes its valve to block the flow path and cut off the gas flow.

The hydrogen station 14 is provided with an ambient temperature sensor (temperature sensor) 42 that detects an ambient temperature Ta. The ambient temperature Ta detected by the ambient temperature sensor 42 is acquired by the dispenser ECU 22.

Configuration of Dispenser ECU

Figure 2:
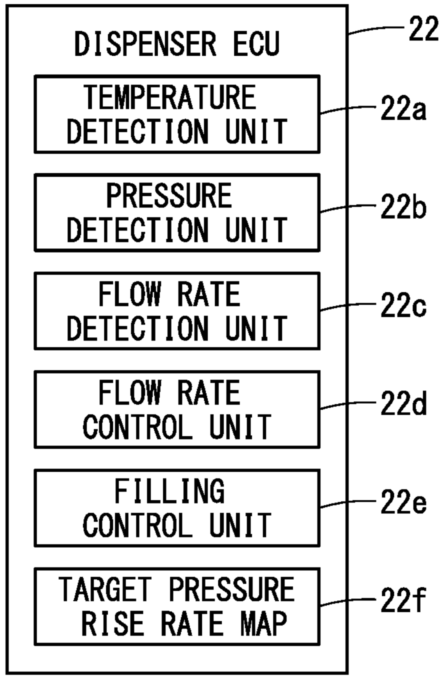
FIG. 2 is a block diagram showing a configuration of a dispenser ECU.

FIG. 2 is a block diagram showing a configuration of the dispenser ECU 22.

The dispenser ECU 22 includes a temperature detection unit 22*a* for receiving the temperatures detected by the temperature sensors 36 and 42, a pressure detection unit 22*b* for receiving the pressure detected by the pressure sensor 34, a flow rate detection unit 22*c* for receiving the flow rate m detected by the flow rate sensor 26, a flow rate control unit 22*d* for adjusting the opening degree of the flow rate adjusting valve 28 to adjust the pressure of the gas supplied from the nozzle 48 through the pipe 100, and a filling control unit 22*e* for setting a target pressure rise rate (pressure rise rate) Rptar. The filling control unit 22*e* controls the target pressure rise rate Rptar based on a target pressure rise rate map 22*f* prepared in advance. The target pressure rise rate map 22*f* includes a table or the like of pressure rise rates corresponding to various outside air temperatures and precool temperatures.

Gas Filling Method According to Embodiment

The hydrogen filling system 10 and the dispenser ECU 22 to which the gas filling method according to the embodiment is applied are basically configured as described above. Here, the gas filling method according to the embodiment will be described with reference to FIG. 3.

The dispenser ECU 22 sets the target pressure rise rate (pressure rise rate) Rptar (pressure/time) which is a temporal change amount of the tank pressure (the pressure of the gas in the tank 50) Pt. As the tank pressure Pt, any one of the dispenser pressure Pd, a pressure obtained by subtracting the pressure loss in the pipe 100 from the dispenser pressure Pd, or an actual tank pressure Pt detected by the pressure sensor 66 may be used. The target pressure rise rate Rptar can be set to a constant (linear) pressure rise rate or a nonlinear pressure rise rate.

Figure 3:
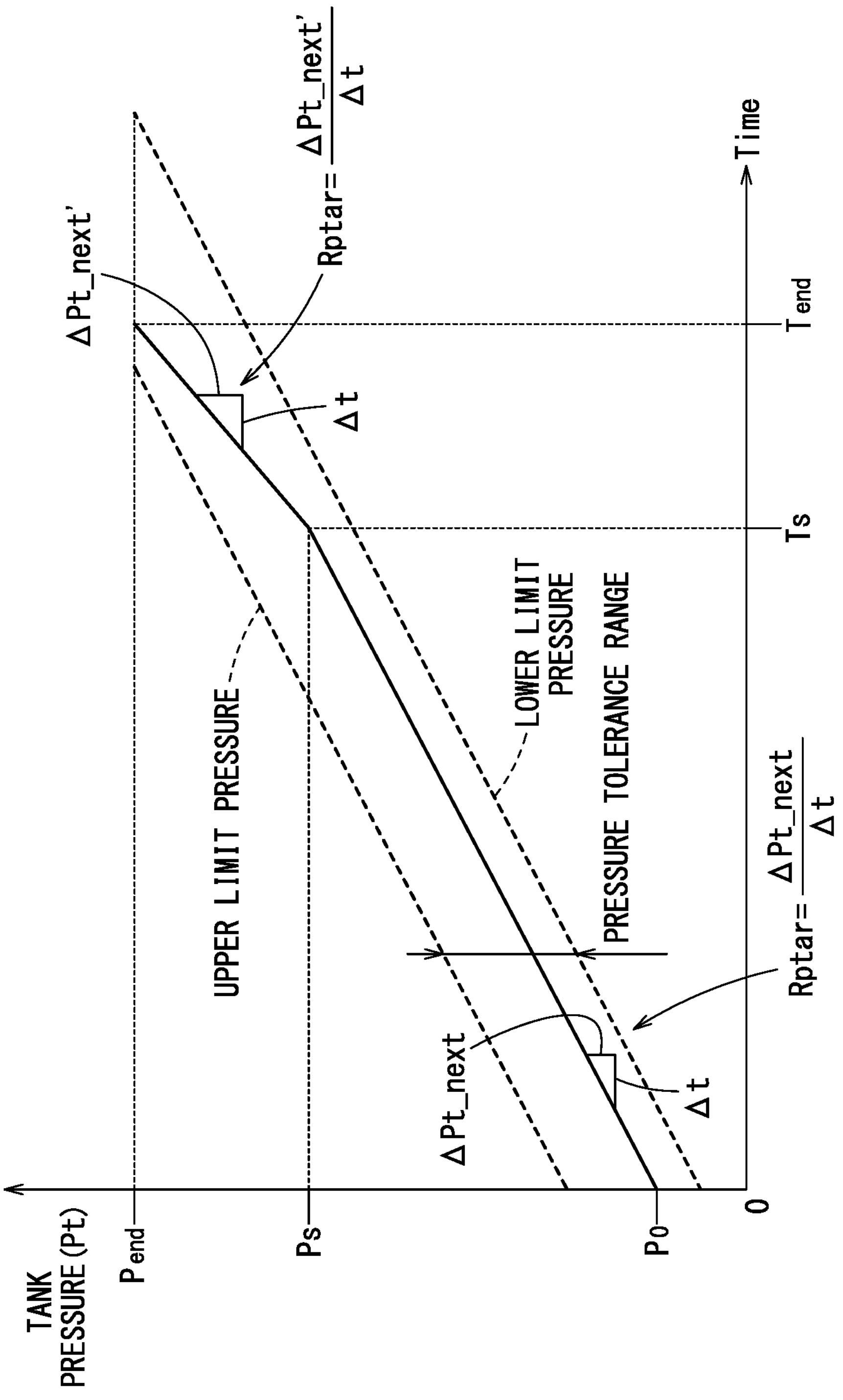
FIG. 3 is a diagram showing a temporal change of a tank pressure according to the embodiment.

As shown in FIG. 3, the target pressure rise rate Rptar is expressed by Rptar=(ΔPt_next)/Δt, which is a target pressure rise amount ΔPt_next as a target rise amount of the tank pressure Pt during a time step Δt which is a predetermined minute time.

The dispenser ECU 22 adjusts the flow rate of the gas with the flow rate control unit 22*d* so that the tank pressure Pt rises at the target pressure rise rate Rptar based on the target pressure rise rate map 22*f*. That is, the dispenser ECU 22 fills the tank 50 with the gas so that the tank pressure Pt rises at the target pressure rise rate Rptar.

In FIG. 3, a temporal change of the tank pressure Pt according to the present invention is shown by a solid line. An upper limit pressure and a lower limit pressure indicated by dotted lines are set for the tank pressure Pt that rises from an initial tank pressure $P_0$ at the target pressure rise rate Rptar. The upper limit pressure is a pressure set so that the temperature of the tank 50 does not exceed a predetermined temperature during filling of the tank 50 with the gas. The upper limit pressure is set to a pressure higher than the rising tank pressure Pt by about 5 to 10 Mpa. The lower limit pressure is a pressure set so that the temperature of the tank 50 does not fall below a predetermined temperature. When the temperature of the tank 50 falls below the predetermined temperature, the density of the gas increases. Therefore, there is a possibility that the tank 50 is filled with an excessive amount of gas. The lower limit pressure is set to a pressure lower than the rising tank pressure Pt by about 2 to 5 Mpa. The upper limit pressure and the lower limit pressure are defined by various standards.

The difference between the upper limit pressure and the lower limit pressure of the tank pressure Pt that rises as the filling proceeds from time 0 is a pressure tolerance range. When the pressure rise rate is set, the pressure in the tank 50 is between the upper limit pressure and the lower limit pressure and within the pressure tolerance range.

Figure 10A:
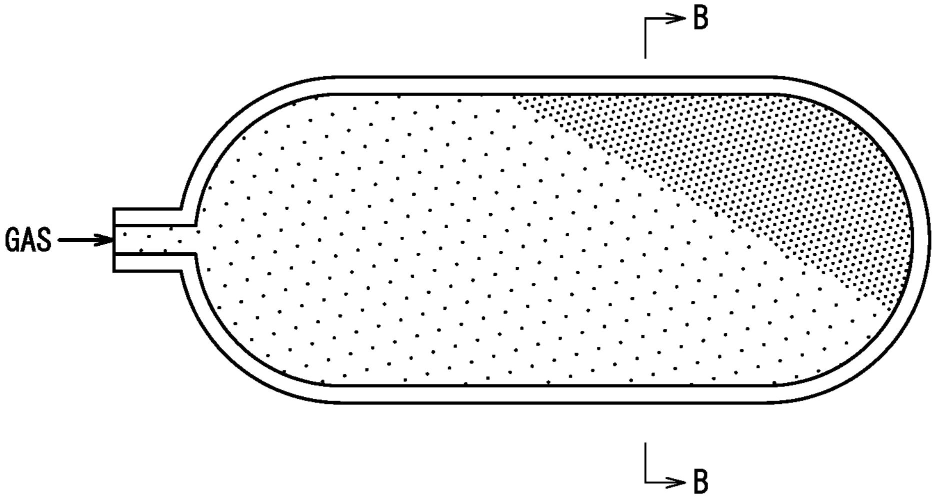
FIG. 10A PRIOR ART
FIG. 10A is a schematic transverse cross-sectional view showing a temperature distribution of a gas in a tank according to the prior art.
Figure 10B:
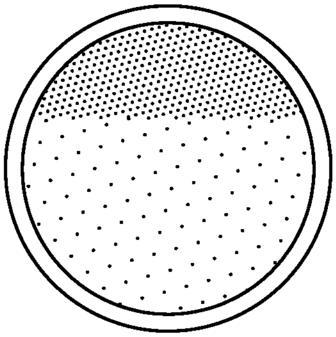
FIG. 10B PRIOR ART
FIG. 10B is a cross-sectional view taken along line B-B of FIG. 10A.

There is a case where a temperature separation pressure (Ps) occurs in the tank 50. The temperature separation pressure Ps is a pressure at which the temperature of the gas is not uniform and a high-temperature portion is generated in a partial region of the tank 50 due to insufficient stirring of the gas in the tank 50 when filled with the gas. In this case, a temperature distribution, that is, temperature separation occurs between the high-temperature portion and the low-temperature portion in the tank 50. Normally, when the pressure of the gas in the tank 50 becomes 50 to 60 Mpa or higher, temperature separation is likely to occur. FIG. 10A and FIG. 10B schematically each show a state where temperature separation occurs.

The temperature separation pressure Ps changes depending on the tank volume, the tank shape, the pressure rise rate, the outside air temperature, the gas temperature, the shape of the blowing nozzle, and the like, and is set in advance by an experiment, a simulation, or the like (a step of setting the temperature separation pressure Ps). When the pressure rise rate is low, the volumetric flow rate of the blown gas decreases and the internal stirring force weakens. Therefore, the temperature separation pressure Ps becomes lower. When the outside air temperature is high and the temperature (precool temperature) of the inflowing gas is low, the buoyancy difference of the gas in the tank 50 increases, and the temperature separation pressure Ps becomes lower. When the tank pressure Pt is relatively low, the volumetric flow rate of the supplied gas is high. Therefore, the interior of the tank 50 is sufficiently stirred, the temperature becomes uniform, and the temperature separation hardly occurs. However, when the tank pressure Pt increases as the filling proceeds, the volumetric flow rate of the supplied gas decreases, the gas becomes difficult to be stirred, and the temperature separation occurs.

As shown in FIG. 3, in the present invention, when the pressure of the gas in the tank 50 reaches the vicinity of the temperature separation pressure Ps (at time Ts), the pressure rise rate is increased. In other words, the pressure rise rate (gradient: $Rptar=(\Delta Pt\_next')/\Delta t$) after exceeding the temperature separation pressure Ps is higher than the pressure rise rate (gradient: $Rptar=(\Delta Pt\_next)/\Delta t$) before reaching the temperature separation pressure Ps. The pressure rise rate after exceeding the temperature separation pressure Ps is preferably set to be higher than the pressure rise rate before reaching the temperature separation pressure Ps by, for example, about 50 to 100%. As a result, the flow rate of the gas flowing into the tank 50 increases. Therefore, stirring of the gas in the tank 50 is promoted and the occurrence of temperature separation can be effectively suppressed. Further, the time required for gas filling can be shortened by increasing the pressure rise rate. In this case, the pressure of the gas is increased at such a pressure rise rate that the pressure of the gas in the tank 50 does not exceed the upper limit pressure indicated by the dotted line in FIG. 3.

When the pressure of the gas in the tank 50 rises with time and reaches a fully-filled pressure Pend at time Tend, the tank 50 is fully filled and the filling is completed.

Description Using Flowchart of Gas Filling Method According to Embodiment

Figure 4:
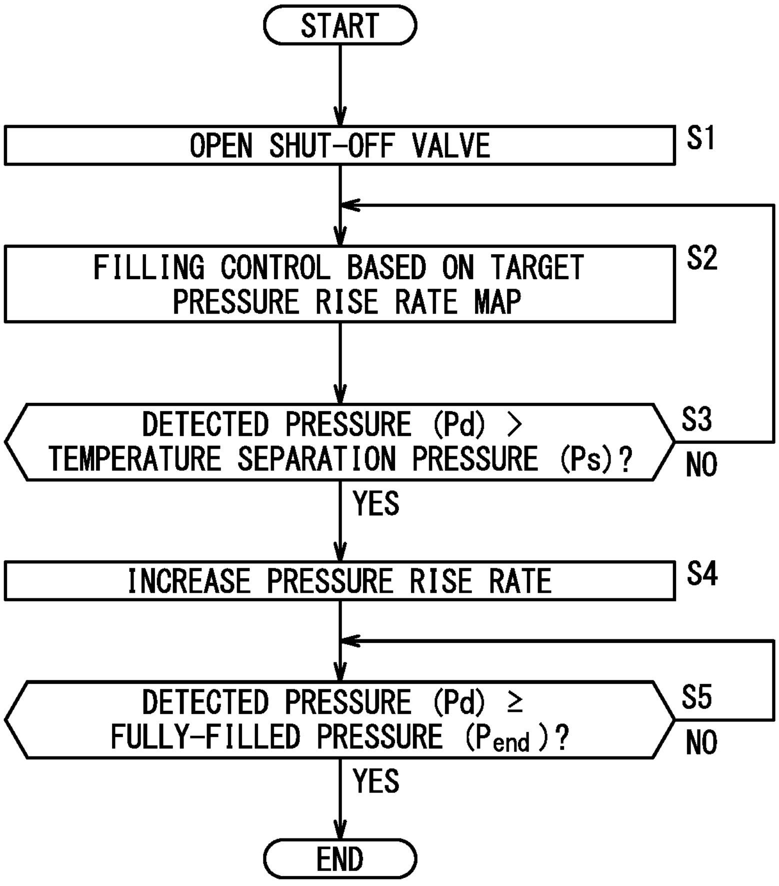
FIG. 4 is a flowchart for explaining the operation of the hydrogen filling system to which the gas filling method according to the embodiment is applied.

Next, the operation of the hydrogen filling system 10 according to an embodiment to which the gas filling method according to the embodiment is applied will be described in detail based on the flowchart shown in FIG. 4. It should be noted that, unless otherwise specified, the CPU of the dispenser ECU 22 executes the program according to the flowchart, and the CPU of the dispenser ECU 22 will also be simply referred to as a CPU.

Prior to starting the gas filling, the nozzle 48 of the hydrogen station 14 is fitted into the receptacle 54 of the vehicle 16 by an operator or the like, in a state where the shut-off valve 24 of the accumulator 20 of the hydrogen station 14 is closed.

When a filling start button (not shown) of the hydrogen station 14 is operated by the operator or the like, the CPU performs preshot filling for filling a small amount of hydrogen to equalize the pressure on the hydrogen station 14 side and the pressure in the tank 50 of the vehicle 16. Further, the CPU obtains the dispenser pressure Pd using the pressure sensor 34 indicating (detecting) the tank pressure Pt, and measures the initial tank pressure $P_0$ of the vehicle 16 ($Pd=Pt=P_0$).

In step S1, the CPU opens the shut-off valve 24 to cause the gas to flow from the accumulator 20 to the tank 50.

In step S2, the CPU controls the filling control unit **22*e* shown in FIG. 2 to refer to the target pressure rise rate map 22*f*** to set the pressure rise rate, and proceeds with the filling of the gas.

In step S3, the CPU checks whether the tank pressure Pt detected by the pressure detection unit **22*b* has reached the temperature separation pressure Ps (time: T=Ts) (a temperature separation pressure detecting step), and if the result is affirmative (step S3: YES), the process proceeds to step S4** to increase the pressure rise rate.

In step S4, the CPU controls the filling control unit **22*e* shown in FIG. 2 to refer to the target pressure rise rate map 22*f* to increase the target pressure rise rate to a target pressure rise rate (for example, $\Delta Pt\_next'/\Delta t$ in FIG. 3) higher than the target pressure rise rate (for example, $\Delta Pt\_next/\Delta t$ in FIG. 3) for a case where the pressure of the gas in the tank 50** is lower than Ps, and proceeds with the filling of the gas (a pressure rise rate increasing step).

In step S5, the CPU checks whether the tank pressure Pt detected by the pressure detection unit **22*b*** has reached the fully-filled pressure Pend, and when the tank pressure Pt reaches the fully-filled pressure Pend (time: T=Tend), the CPU ends the current filling process.

Gas Filling Method According to First Modification

Figure 5:
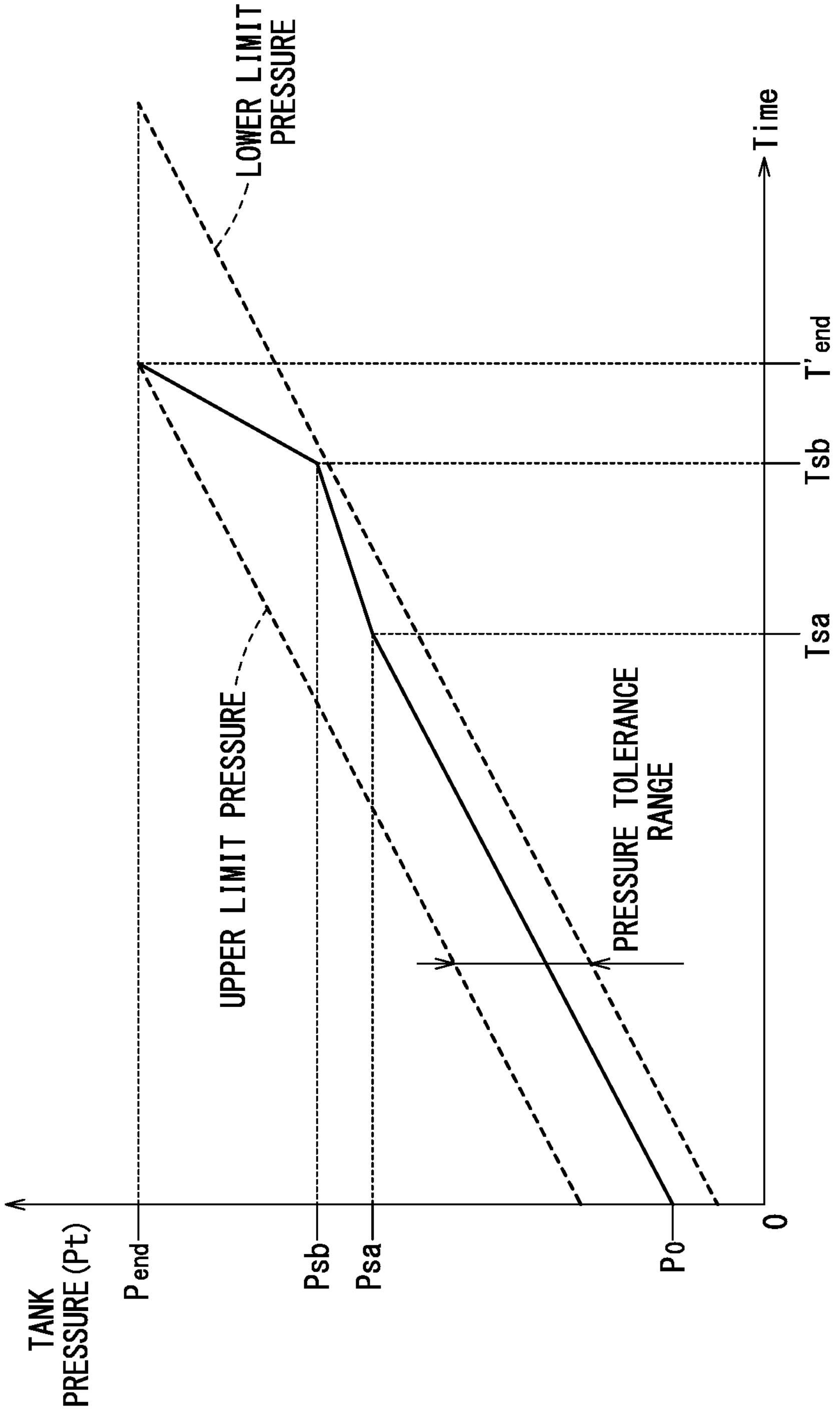
FIG. 5 is a diagram showing a pressure rise rate according to a first modification.

A gas filling method according to a first modification will be described with reference to FIG. 5.

In the gas filling method according to the first modification, the pressure rise rate decreases when, before reaching the vicinity of a temperature separation pressure Psb (=Ps) (time: T=Tsb), the pressure of the gas in the tank 50 reaches the vicinity of a pressure rise rate decrease start pressure Psa (time: T=Tsa), which is lower than the temperature separation pressure Psb. In other words, the gradient of the straight line indicating the pressure rise rate after exceeding the pressure rise rate decrease start pressure Psa is smaller than the gradient of the straight line indicating the pressure rise rate before reaching the pressure rise rate decrease start pressure Psa. Accordingly, the pressure in the tank 50 approaches the lower limit pressure as the filling proceeds, and therefore, after the tank pressure Pt reaches the temperature separation pressure Psb, the pressure rise rate can be set to be a further higher value in a manner so that the tank pressure Pt falls within the pressure tolerance range. Note that the tank pressure Pt needs to be always maintained higher than the lower limit pressure. The pressure rise rate is controlled so that the tank pressure Pt falls within the pressure tolerance range.

The pressure rise rate decrease start pressure Psa is set to a pressure lower than the temperature separation pressure Psb and in the vicinity of the temperature separation pressure Psb.

When the pressure of the gas in the tank 50 reaches the vicinity of the temperature separation pressure Psb (time: T=Tsb), the pressure rise rate increases. In other words, the gradient of the straight line indicating the pressure rise rate after exceeding the temperature separation pressure Psb is larger than the gradient of the straight line indicating the pressure rise rate before reaching the temperature separation pressure Psb. Accordingly, the pressure of the gas in the tank 50 rises, the flow rate of the gas flowing into the tank 50 increases, and the stirring effect is enhanced. Therefore, the occurrence of temperature separation can be effectively suppressed. In this case, the pressure of the gas in the tank 50 rises so as not to exceed the upper limit pressure indicated by the dotted line in FIG. 5.

When the pressure of the gas in the tank 50 rises with time and reaches the fully-filled pressure Pend at time T'end, the filling is completed.

Figure 6:
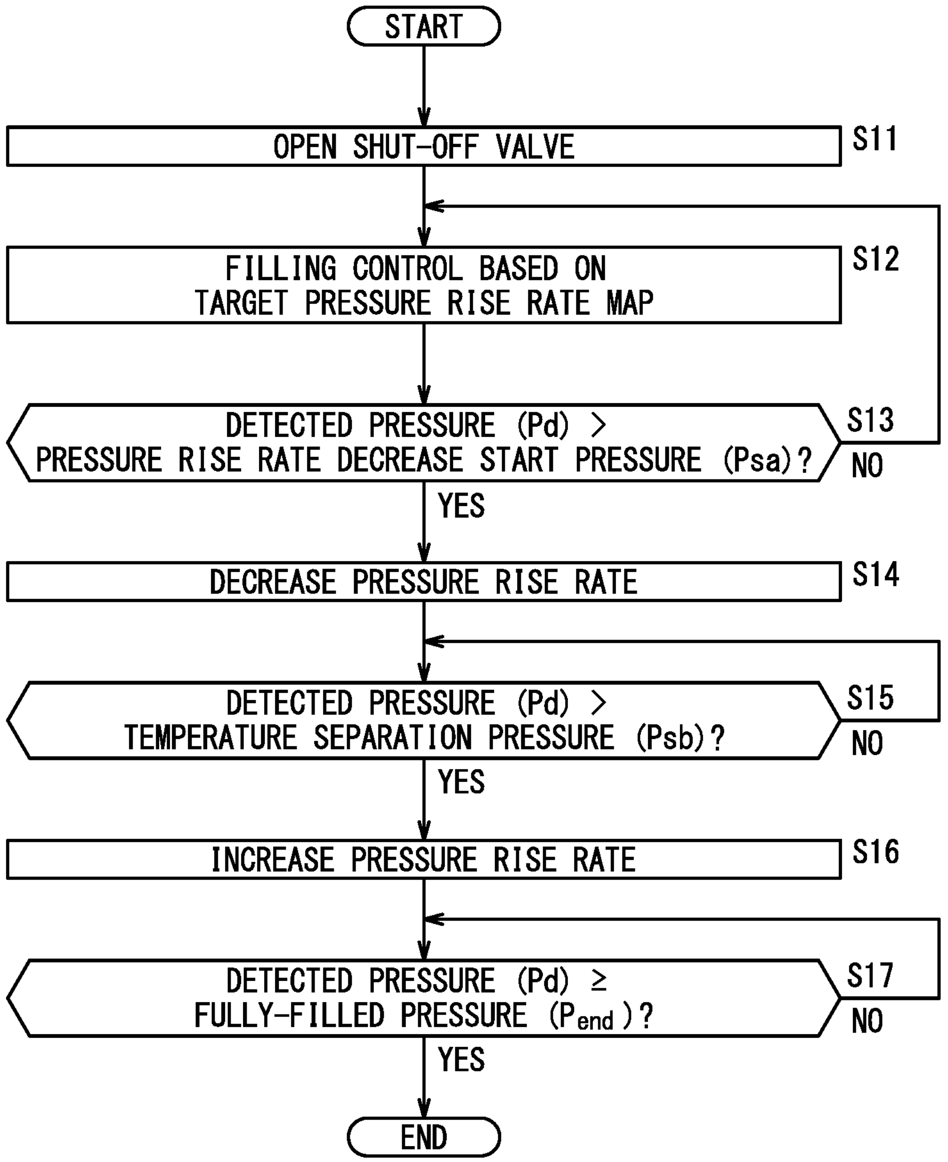
FIG. 6 is a flowchart for explaining the operation of the hydrogen filling system to which a gas filling method according to the first modification is applied.

Description Using Flowchart of Gas Filling Method According to First Modification Next, the operation of the hydrogen filling system 10 to which the gas filling method according to the first modification is applied will be described in detail based on the flowchart shown in FIG. 6.

In step S11, the CPU opens the shut-off valve 24 to cause the gas to flow from the accumulator 20 to the tank 50.

In step S12, the CPU controls the filling control unit 22*e* shown in FIG. 2 to refer to the target pressure rise rate map 22*f* to set the pressure rise rate, and proceeds with the filling of the gas.

In step S13, the CPU checks whether the pressure of the gas in the tank 50 detected by the pressure detection unit 22*b* has reached the pressure rise rate decrease start pressure Psa (time: T=Tsa), and if the result is affirmative (step S13: YES), the process proceeds to step S14 to decrease the pressure rise rate.

In step S14, the CPU controls the filling control unit 22*e* shown in FIG. 2 to refer to the target pressure rise rate map 22*f* to proceed with the filling of the gas at a pressure rise rate lower than the pressure rise rate for a case where the pressure of the gas in the tank 50 is lower than Psa (a pressure rise rate decreasing step). In this case, the CPU sets the pressure rise rate so that the pressure of the gas in the tank 50 always exceeds the lower limit pressure, and proceeds with the filling of the gas.

In Step S15, the CPU checks whether the pressure of the gas in the tank 50 detected by the pressure detection unit 22*b* has reached the temperature separation pressure Psb (time: T=Tsb) (a temperature separation pressure detecting step), and if the result is affirmative (step S15: YES), the process proceeds to Step S16 to increase the pressure rise rate.

In step S16, the CPU controls the filling control unit 22*e* shown in FIG. 2 to refer to the target pressure rise rate map 22*f* to proceed with the filling of the gas at a pressure rise rate higher than the pressure rise rate for a case where the pressure of the gas in the tank 50 is lower than Psb (a pressure rise rate increasing step).

In Step S17, the CPU checks whether the dispenser pressure Pd has reached the fully-filled pressure Pend of the tank 50, and when the dispenser pressure Pd reaches the fully-filled pressure Pend, the CPU ends the current filling process.

Gas Filling Method According to Second Modification

Figure 7:
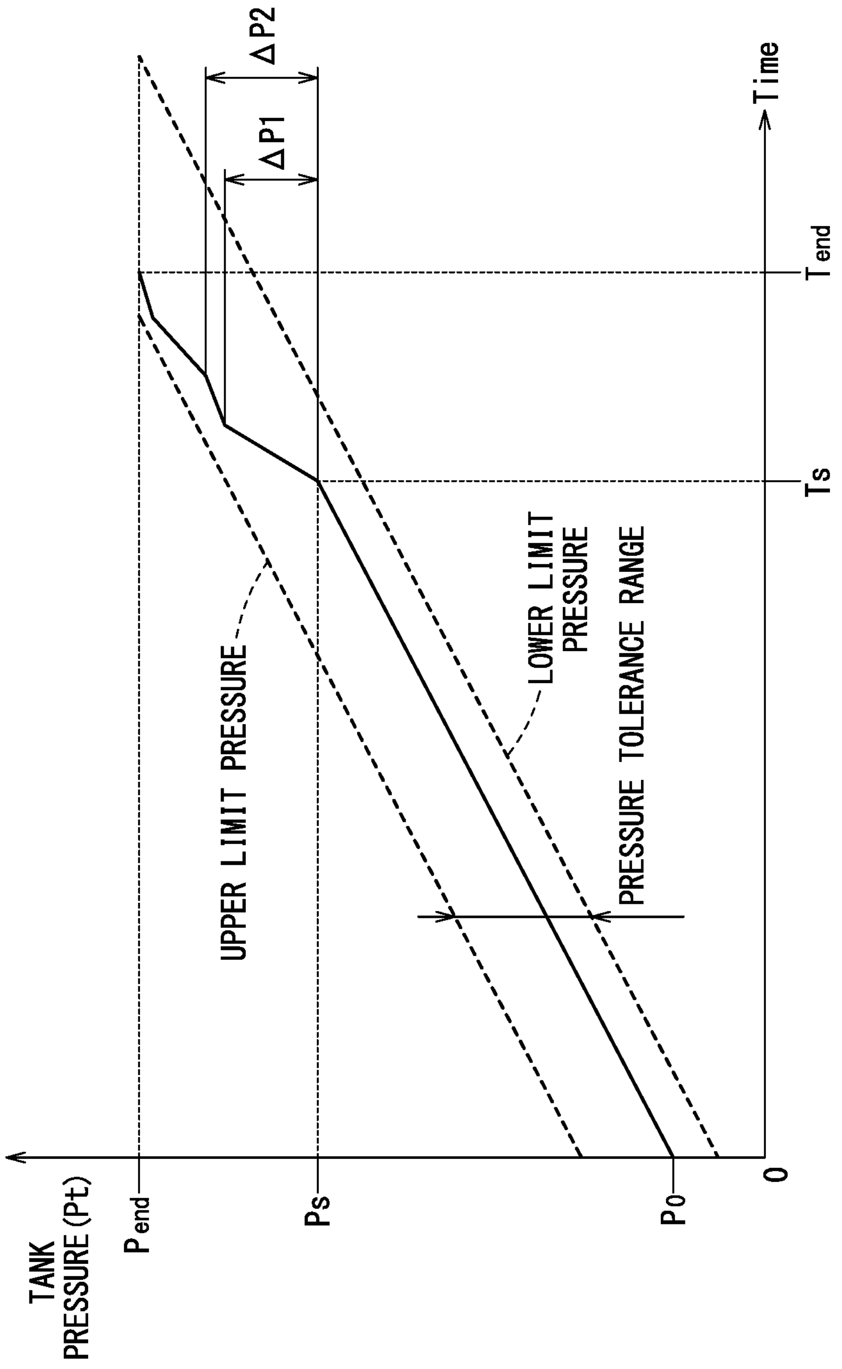
FIG. 7 is a diagram showing a pressure rise rate according to a second modification.

A gas filling method according to a second modification will be described with reference to FIG. 7.

In the gas filling method according to the second modification, when the pressure of the gas in the tank 50 reaches the vicinity of the temperature separation pressure Ps (time: T=Ts), the pressure rise rate increases. Thereafter, when the pressure of the gas in the tank 50 reaches a predetermined pressure higher than the temperature separation pressure Ps, the pressure rise rate decreases as in the gas filling method of the first modification. Thereafter, the increase and decrease of the pressure rise rate are repeated (a pressure rise rate increasing/decreasing step), and when the pressure of the gas in the tank 50 reaches the fully-filled pressure Pend at time Tend, the filling is completed. The number of repetitions of the increase and decrease of the pressure rise rate is not particularly limited, and may be one or more. Filling control is performed at such a pressure rise rate that the pressure of the gas in the tank 50 is always within the above-described pressure tolerance range.

Figure 8:
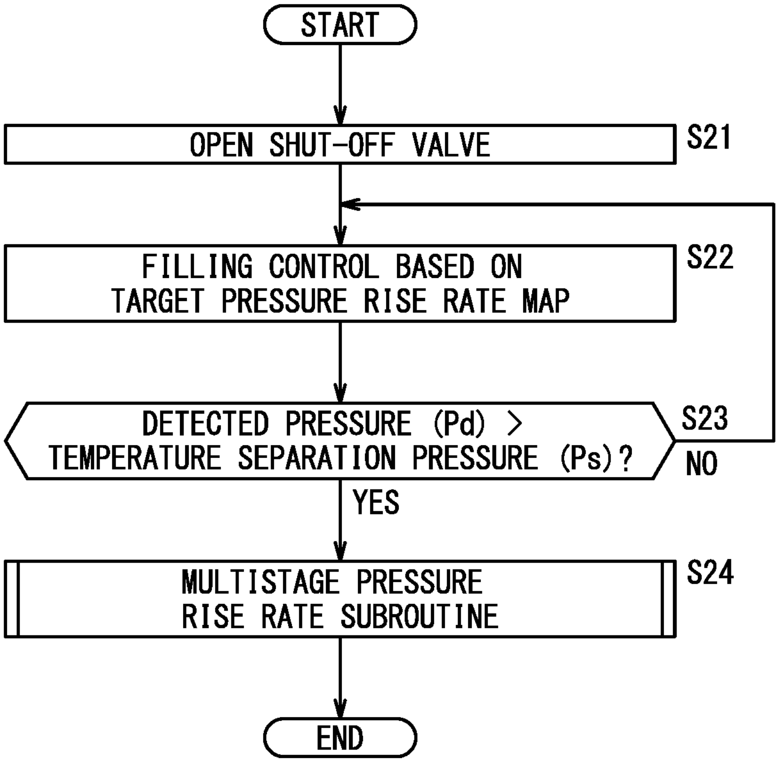
FIG. 8 is a flowchart for explaining the operation of the hydrogen filling system to which a gas filling method according to the second modification is applied.

Description Using Flowchart of Gas Filling Method According to Second Modification Next, the operation of the hydrogen filling system 10 to which the gas filling method according to the second modification is applied will be described in detail based on the flowchart and the subroutine shown in FIG. 8 and FIG. 9, respectively.

In step S21, the CPU opens the shut-off valve 24 to cause the gas to flow from the accumulator 20 to the tank 50.

In step S22, the CPU controls the filling control unit 22*e* shown in FIG. 2 to refer to the target pressure rise rate map 22*f* to set the pressure rise rate, and proceeds with the filling of the gas.

In step S23, the CPU checks whether the pressure of the gas in the tank 50 detected by the pressure detection unit 22*b* has reached the temperature separation pressure Ps (a temperature separation pressure detecting step), and if the result is affirmative (step S23: YES), the process proceeds to multistage pressure rise rate subroutine S24.

Figure 9:
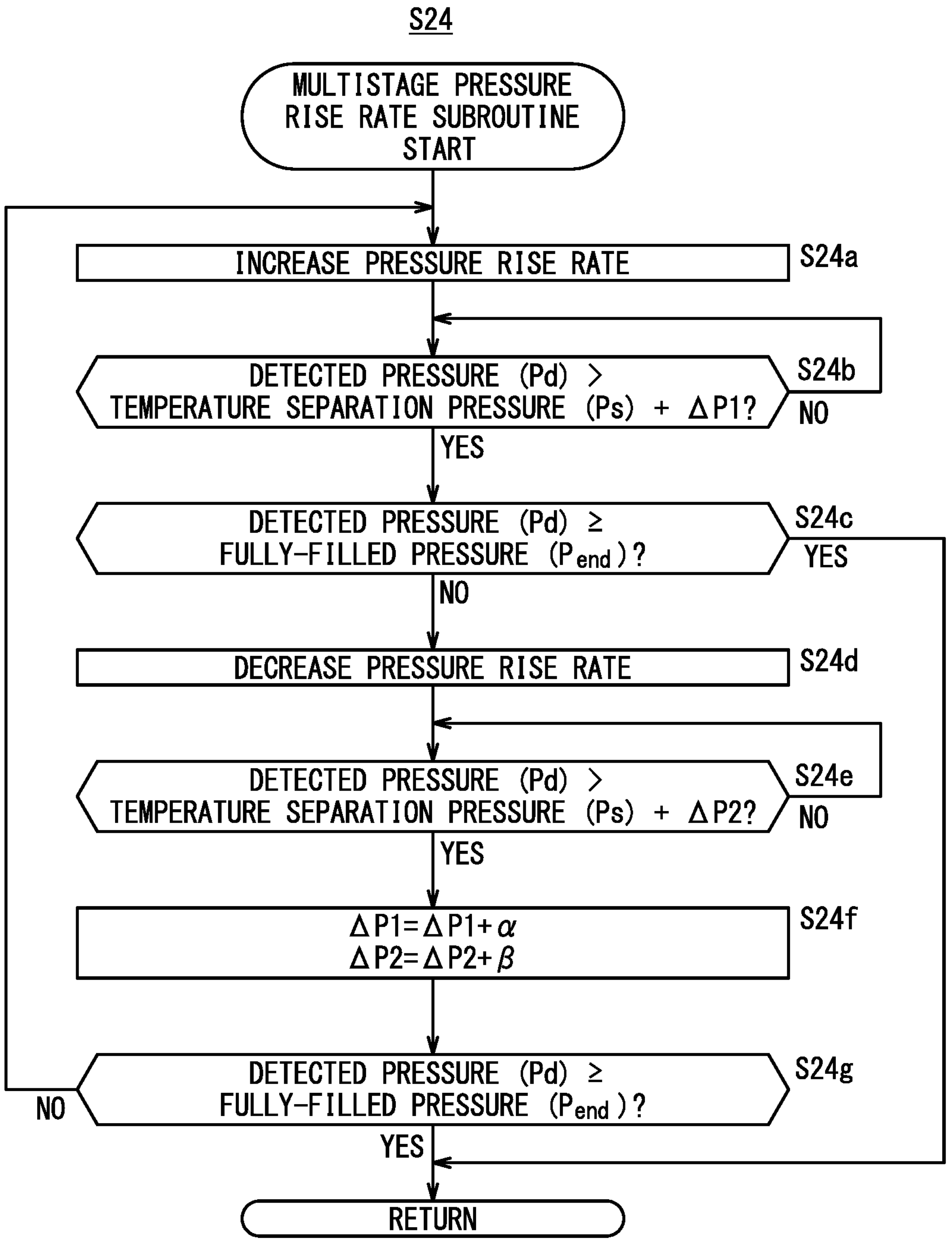
FIG. 9 is a subroutine in the flowchart for the hydrogen filling system to which the gas filling method according to the second modification is applied.

FIG. 9 shows a detailed flowchart of the multistage pressure rise rate subroutine S24. In step S24*a*, the CPU controls the filling control unit 22*e* shown in FIG. 2 to refer to the target pressure rise rate map 22*f* to proceed with the filling of the gas at a pressure rise rate higher than the pressure rise rate for a case where the pressure of the gas in the tank 50 is lower than Ps (a pressure rise rate increasing step).

In step S24*b*, the CPU checks whether the pressure in the tank 50 detected by the pressure detection unit 22*b* has reached a pressure (the temperature separation pressure Ps+ΔP1), and if the result is affirmative (step S24*b*: YES), the process proceeds to step S24*c*.

ΔP1 is a pressure by which the pressure (Ps+ΔP1) of the gas in the tank 50 does not reach the upper limit pressure, and is appropriately set in consideration of the size of the tank 50, the occurrence condition of the temperature distribution in the tank 50, the optimum filling time, and the like.

In step S24*c*, the CPU checks whether the pressure in the tank 50 detected by the pressure detection unit 22*b* has reached the fully-filled pressure Pend, and if the result is affirmative (step S24*c*: YES), the CPU ends the filling process. On the other hand, if the result is negative (step S24*c*: NO), the process proceeds to step S24*d* to decrease the pressure rise rate.

In step S24*d*, the CPU controls the filling control unit 22*e* shown in FIG. 2 to refer to the target pressure rise rate map 22*f* to proceed with the filling of the gas at a pressure rise rate lower than the pressure rise rate for a case where the pressure of the gas in the tank 50 is lower than Ps (a pressure rise rate decreasing step). In this case, the CPU sets the pressure rise rate so that the pressure of the gas in the tank 50 always exceeds the lower limit pressure, and proceeds with the filling of the gas.

In step S24*e*, the CPU checks whether the pressure in the tank 50 detected by the pressure detection unit 22*b* has reached a pressure (the temperature separation pressure Ps+ΔP2), and if the result is affirmative (step S24*e*: YES), the process proceeds to step S24*f*.

ΔP2 is a pressure by which the pressure (Ps 30 ΔP2) of the gas in the tank 50 does not reach the upper limit pressure, and is appropriately set in consideration of the size of the tank 50, the state of the temperature distribution of the gas in the tank 50, the optimum filling time, and the like. Note that ΔP2 is a pressure higher than ΔP1.

In step S24*f*, the CPU adds predetermined pressure increments α and β to ΔP1 and ΔP2, respectively, and the process proceeds to S24*g*.

In step S24*g*, the CPU checks whether the pressure in the tank 50 detected by the pressure detection unit 22*b* has reached the fully-filled pressure Pend, and if the result is affirmative (step S24*g*: YES), the process exits the subroutine and the filling process is completed. On the other hand, if the result is negative (step S24*g*: NO), the process returns to the beginning of the multistage pressure rise rate subroutine S24, and proceeds to step S24*a* to increase the pressure rise rate.

Invention that can be Grasped from Embodiment and Modifications

The invention that can be grasped from the above embodiment and modifications will be described below. For convenience of understanding, some of the constituent elements are denoted by the reference numerals used in the above-described embodiment, but the constituent elements are not limited to those denoted by the reference numerals.

(1) The gas filling method according to the present invention is a gas filling method for filling the tank 50 with gas from the accumulator 20 of the gas in the gas filling system 10, the gas filling system including the tank, the accumulator, and the pipe 100 configured to connect the accumulator and the tank, and supply the gas from the accumulator to the tank, the gas filling method including: the step of setting the temperature separation pressure Ps that is a pressure of the gas at which temperature separation occurs during filling of the tank with the gas; the temperature separation pressure detecting step (S3) of detecting whether the pressure in the tank 50 has reached the temperature separation pressure during filling of the tank with the gas; and the pressure rise rate increasing step (S4) of filling the tank 50 with the gas by increasing the pressure rise rate of the pressure in the tank 50 after the pressure in the tank 50 has reached the temperature separation pressure.

With this configuration, when the tank pressure Pt reaches the preset temperature separation pressure Ps and temperature separation starts to occur, the pressure rise rate is increased compared to before the tank pressure Pt reaches the temperature separation pressure Ps, the volumetric flow rate of the supplied gas is increased, and stirring of the gas in the tank 50 is promoted. As a result, with a simple method based on filling control of the hydrogen station 14 without providing a special mechanism for promoting stirring in the tank 50, it is possible to suppress occurrence of temperature separation in the tank 50, complete filling of the tank 50 with the gas from the accumulator 20 through the pipe 100 in a short time, and achieve gas filling with high performance and high efficiency.

(2) Further, in the gas filling method, the pressure rise rate may be increased in a manner so that the pressure in the tank falls within the pressure tolerance range.

With this configuration, the tank pressure Pt does not exceed the upper limit pressure of the pressure tolerance range and does not fall below the lower limit pressure of the pressure tolerance range. Since the tank pressure Pt does not exceed the upper limit pressure, the tank temperature Tt does not exceed a predetermined temperature, and the tank 50 is not damaged. Since the tank pressure Pt does not fall below the lower limit pressure, it is possible to prevent the gas density from increasing and to prevent an excessive gas from being filled.

(3) Further, the gas filling method may further include the pressure rise rate decreasing step (S14) of filling the tank 50 with the gas by decreasing the pressure rise rate in a manner so that the pressure in the tank 50 falls within the pressure tolerance range before the pressure in the tank 50 reaches the temperature separation pressure Ps.

With this configuration, the pressure tolerance range can be effectively utilized to set the pressure rise rate to a further higher value in a manner so that the pressure in the tank falls within the pressure tolerance range, and the stirring of the gas can be further promoted.

(4) Furthermore, the gas filling method may further include, after the pressure rise rate increasing step, the pressure rise rate increasing/decreasing step of filling the tank with the gas by repeating a decrease of the pressure rise rate and an increase of the pressure rise rate.

With this configuration, stirring of the gas in the tank 50 can be further promoted by changing the pressure rise rate in a manner so that the pressure in the tank falls within the pressure tolerance range.

The present invention is not limited to the above disclosure, and various configurations can be adopted therein without departing from the essence and gist of the present invention.

The invention claimed is:

1. A gas filling method for filling a tank with gas from an accumulator of the gas in a gas filling system,
the gas filling system including:
the tank;
the accumulator; and
a pipe configured to connect the accumulator and the tank, and supply the gas from the accumulator to the tank,
the gas filling method comprising:
setting a temperature separation pressure that is a pressure of the gas at which temperature separation occurs during filling of the tank with the gas;
detecting whether a pressure in the tank has reached the temperature separation pressure during the filling of the tank with the gas; and
filling the tank with the gas by increasing a pressure rise rate of the pressure in the tank after the pressure in the tank has reached the temperature separation pressure.

2. The gas filling method according to claim 1, wherein
the pressure rise rate is increased in a manner so that the pressure in the tank falls within a pressure tolerance range.

3. The gas filling method according to claim 2, further comprising filling the tank with the gas by decreasing the pressure rise rate in a manner so that the pressure in the tank falls within the pressure tolerance range before the pressure in the tank reaches the temperature separation pressure.

4. The gas filling method according to claim 1, further comprising, after filling the tank with the gas by increasing the pressure rise rate, filling the tank with the gas by repeating a decrease of the pressure rise rate and an increase of the pressure rise rate.

* * * * *